May 22, 1956
J. W. KINCHIN
2,746,575
DISC BRAKES FOR ROAD AND OTHER VEHICLES
Filed Aug. 19, 1952
3 Sheets-Sheet 1
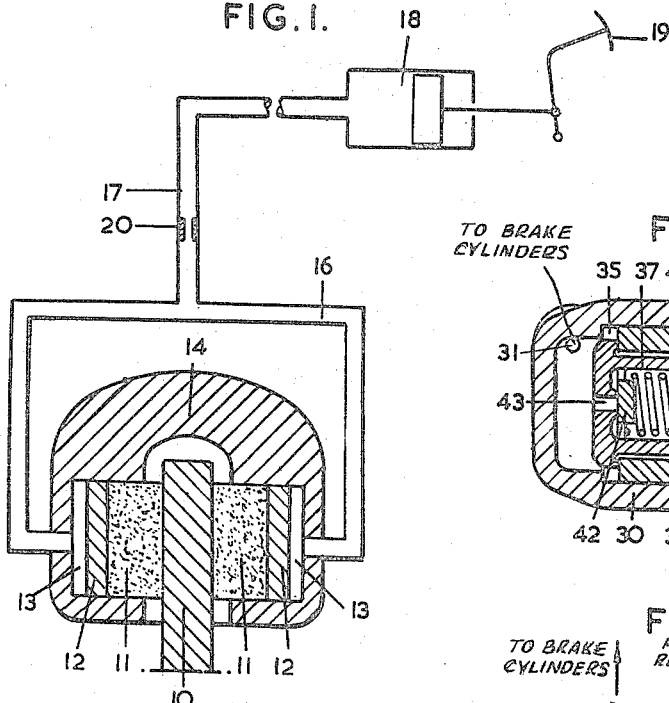
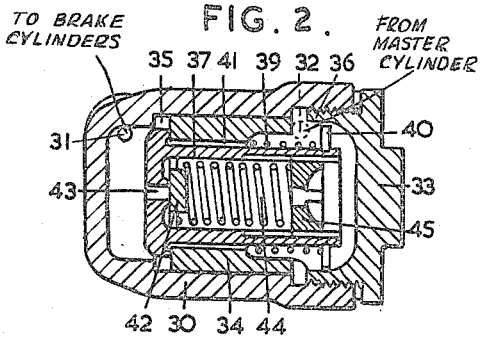
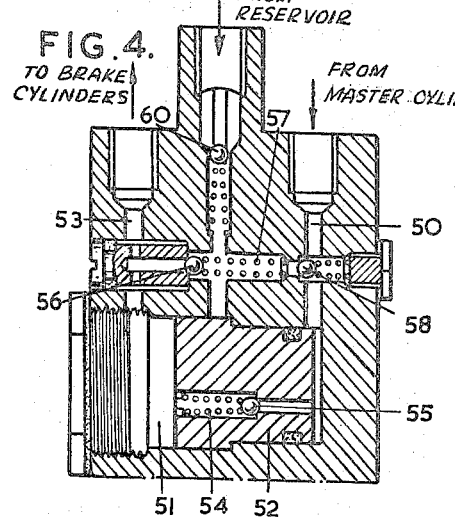
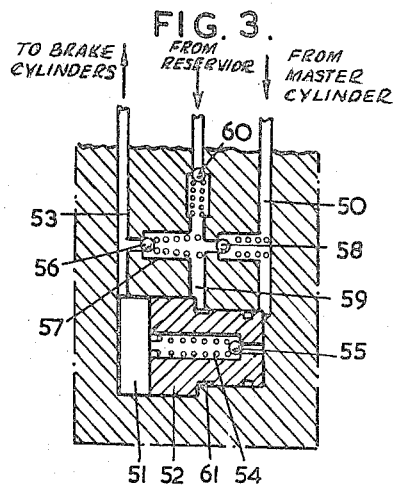
INVENTOR:
JOSEPH WARWICK KINCHIN
by Walter S. Pleston
ATTORNEY May 22, 1956  J. W. KINCHIN  2,746,575
DISC BRAKES FOR ROAD AND OTHER VEHICLES
Filed Aug. 19, 1952  3 Sheets-Sheet 2
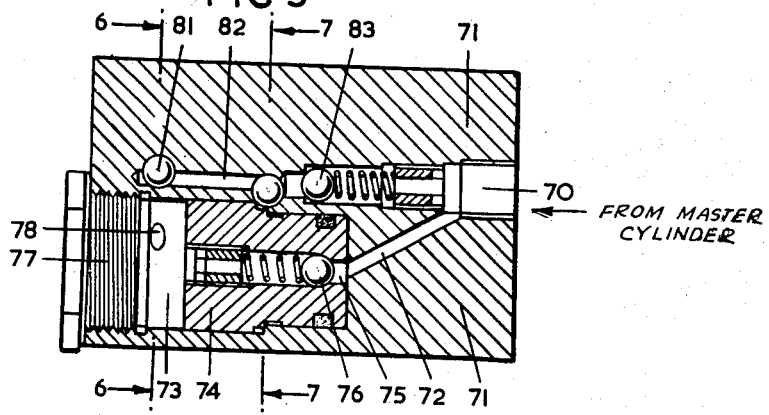
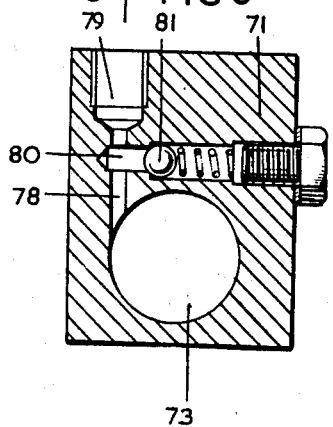
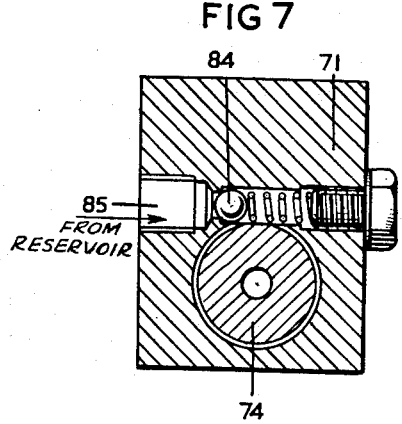
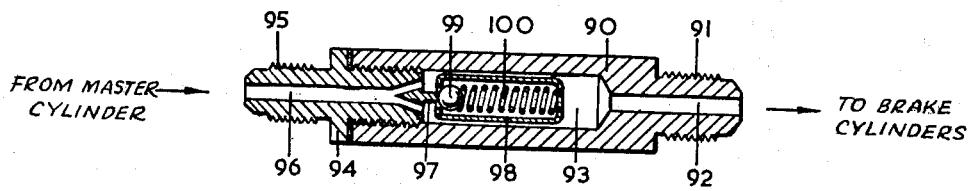
INVENTOR
JOSEPH WARWICK KINCHIN
by Walter S. Pleaton
ATTORNEY May 22, 1956 J. W. KINCHIN 2,746,575
DISC BRAKES FOR ROAD AND OTHER VEHICLES
Filed Aug. 19, 1952 3 Sheets-Sheet 3

INVENTOR
JOSEPH WARWICK KINCHIN
by Walter S. Pleston
ATTORNEY

United States Patent Office 2,746,575
Patented May 22, 1956

2,746,575

DISC BRAKES FOR ROAD AND OTHER VEHICLES

Joseph Warwick Kinchin, Lowsonford, near Lapworth, England, assignor to Girling Limited, Birmingham, England, a British company Application August 19, 1952, Serial No. 305,154

Claims priority, application Great Britain August 21, 1951

11 Claims. (Cl. 188—152)

This invention relates to improvements in disc brakes for road and other vehicles of the type in which opposed friction pads are adapted to be urged into engagement with opposite faces of a rotating disc at one or more points, the remainder of the disc being left open for cooling. The pads are mounted in the open inner ends of opposed axially aligned hydraulic cylinders in each of which works a piston engaging and actuating the pad, liquid under pressure being supplied simultaneously from a master cylinder to the liquid spaces in the brake cylinders between the pistons and the closed outer ends of the cylinders so that the pads are urged with equal force into engagement with the disc.

Tests have shown that when a vehicle fitted with a brake of this type is changing direction, one of the pads with its associated piston tends to move axially in its cylinder away from the disc and to force liquid from the cylinder back into the recuperation chamber of the master cylinder. The same effect can be produced by other factors such as lack of truth of the brake disc and wear in the wheel bearings or associated parts. Thus when the brake is next applied sufficient liquid must be displaced from the master cylinder to advance the pad into engagement with the disc before the brake becomes effective and there is a substantial increase in the pedal travel.

According to my invention this difficulty is overcome by permitting free passage of liquid between the opposed brake cylinders but restricting the rate of flow of liquid between the master cylinder and the brake cylinders.

This control of the rate of flow may be effected in various ways.

In the simplest practical form of my invention the liquid spaces of the two brake cylinders are connected by a pipe or passage of substantial cross-sectional area and the pipe conveying liquid from the master cylinder is connected to that pipe or passage through a restricted orifice or other convenient means for restricting the rate of flow.

The orifice is of sufficient dimensions not to delay the application of the brake when the pedal is depressed but when one of the pads and its associated piston tends to move axially in its cylinder liquid is transferred from one brake cylinder to the other and the travel of the master cylinder piston in the application of the brake is not appreciably affected.

Another advantage is that substantially equal pressures are maintained in the two brake cylinders during braking so that the two pads take an equal share in the braking effort and there is no tendency for the brake disc to be distorted.

In another practical form of my invention there is provided in the pipe line conveying liquid from the master cylinder to a pipe or passage connecting the brake cylinders a back pressure valve so arranged that liquid is allowed to pass from the master cylinder to the brake cylinder at a predetermined pressure but is only allowed to return from the brake cylinders to the master cylinders at a considerably higher pressure.

In a preferred practical arrangement the back-pressure valve incorporates a piston having a limited axial movement between stops in a cylinder of which the rear end is connected to the master cylinder and the front end is connected to a pipe or passage connecting the brake cylinders. Liquid supplied under pressure from the master cylinder advances the piston which displaces liquid from the front end of the valve cylinders into the brake cylinders to apply the brakes. If the piston reaches the limit of its travel before the brake is fully applied additional liquid from the master cylinder can flow through a one-way valve in the piston. When the brake is released the liquid returning from the brake cylinder returns the piston in the valve cylinder and in the off position of the brake liquid can only pass from the brake cylinders to the master cylinder through another valve loaded to a value which is not reached in normal operation of the brake.

Some practical embodiments of my invention are illustrated by way of example in the accompanying drawings in which:

Figure 1 is a diagrammatic view of a braking system embodying my invention in its simplest form.

Figure 2 is a section of a back-pressure valve designed to be fitted in a pipe line connecting a master cylinder to the brake cylinders.

Figure 3 is a section in diagrammatic form of another back-pressure valve.

Figure 4 is a section of a practical form of the valve shown in Figure 3.

Figure 5 is a section of a further form of valve.

Figures 6 and 7 are cross-sections on the lines 6—6 and 7—7 respectively of Figure 5.

Figure 8 is a section of a simplified form of valve.

Figure 9:
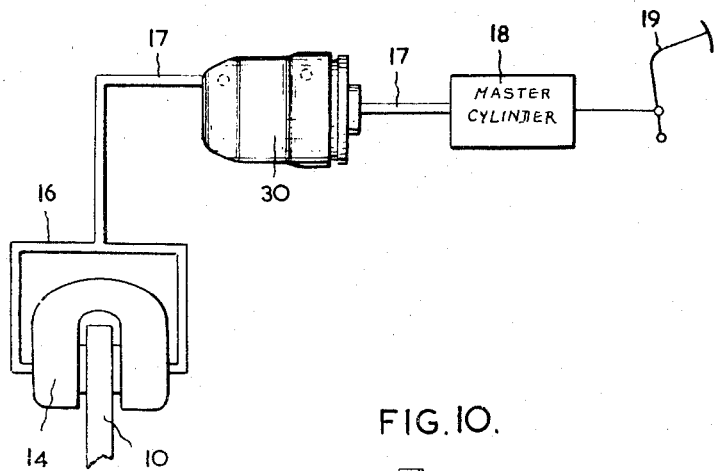
Figure 10:
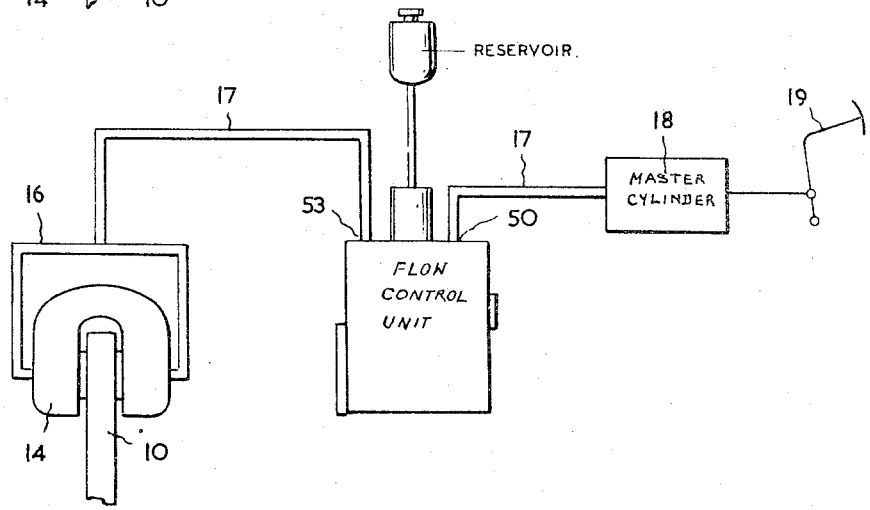

Fig. 9 shows a braking system incorporating the back-pressure valve of Fig. 2. Fig. 10 shows a braking system incorporating the back-pressure valve of Fig. 4 and includes a reservoir for hydraulic fluid feeding that valve.

In the diagrammatic arrangement shown in Figure 1, 10 is a portion of a rotatable brake disc adapted to be mounted on or to rotate with a wheel of a vehicle. Opposite faces of the disc are adapted to be engaged by brake pads 11, 11 backed by pistons 12, 12 and mounted in opposed axially aligned cylinders 13, 13 in a fixed yoke 14 which straddles the edge of the disc. The liquid spaces of the cylinders 13 are connected by a pipe 16 which is connected by a pipe 17 to a master cylinder 18 of which the piston is actuated by a pedal 19. A restriction 20 is located in the pipe 17 adjacent to its junction with the pipe 16, the bore of the orifice in the restriction being of such dimensions that it does not delay the application of the brake when the pedal 19 is depressed but when one of the pads and its associated piston tends to move axially in its cylinder away from the brake disc liquid is simply transferred from that cylinder to the other and the travel of the master cylinder piston in the application of the brake is not affected.

The back-pressure valve shown in Figure 2 is designed for insertion into a pipe line connecting a master cylinder to a pipe or passage connecting two opposed brake cylinders. It comprises a cylinder 30 closed at its forward end which is adapted to be connected at 31 to a pipe or passage connecting the brake cylinders. The rear end of the cylinder which is connected at 32 to a pipe line leading to the master cylinder is closed by a screwed plug 33. A hollow piston 34 works in the cylinder between stops formed by an internal shoulder 35 in the cylinder adjacent to its closed end and by an annular flange 36 on the plug 33. A valve sleeve 37 working in the piston has at its forward end an annular head normally held in engagement with the forward end of the piston by a spring 39 housed in a recess in the rear end of the piston around the sleeve, a ring 40 being mounted on the rear end of the sleeve to form an abutment for the spring. Longitudinal grooves 41 are formed in the surface of the valve sleeve for the passage of liquid when the head has been moved away from its seating on the end of the piston by a pressure of liquid in the rear end of the cylinder sufficient to overcome the valve loading.

Passage of liquid through the piston in the reverse direction is controlled by a valve head 42 engaging a seating at the rear end of an axial bore 43 in the forward end of the valve sleeve, this head normally being held closed by a heavy spring 44 abutting between the head and an apertured plug 45 screwed or otherwise fixed in the sleeve.

Normally the piston 34 is in its rearmost position, that is at the end of its cylinder to which the master cylinder is connected. When the brake pedal is operated the initial displacement of liquid from the master cylinder advances the piston 34 up to its forward stop 35 and the piston displaces the liquid from the forward end of the valve cylinder into the brake cylinders to initiate the application of the brake. Further displacement of the piston is prevented until the pressure behind the piston builds up to a value sufficient to overcome the loading of the valve sleeve 37. This pressure may be of the order of 2½ lbs. per square inch. Liquid then passes through the valve and the brake is applied in the normal way with a force proportional to the force exerted on the brake pedal, the valve 37 closing when the pressure in front of the piston becomes static.

When the brake pedal is released the pressure behind the piston 34 is relieved and a certain amount of liquid returns from the brake cylinders due to the recovery of the friction pads and other non-rigid parts of the assembly, this liquid entering the liquid space at the forward end of the valve cylinder and causing the valve piston to move rearwardly.

If for any reason a brake pad tends to move away from the disc it can only do so by forcing further liquid from the brake cylinder into the forward end of the valve cylinder but the total movement is limited by the return of the valve piston to its rearmost position which limits the increase in volume of the liquid space at the forward end of the cylinder.

The effect of that is to prevent any further displacement of liquid from a brake cylinder into the valve cylinder due to centrifugal force, deflection of the brake disc, or any other cause, and liquid displaced from the brake cylinder behind one friction pad will be transferred to the opposite cylinder.

The valve 42 in the sleeve 37 allows liquid to flow from the space at the forward end of the valve cylinder through the piston if the pressure in that space should for any reason build up to a value sufficient to overcome the loading of the valve which may be anything between 100 and 1000 lbs. per square inch.

The pressure might build up to such a value owing to temperature rise during prolonged or repeated braking and the valve limits the maximum pressure which can be reached and allows liquid to return from the brake cylinders to the reservoir for the master cylinder when it is reached.

The valve piston may be a differential piston with the greater diameter at the forward or brake end so that a smaller displacement of the master cylinder piston is required to produce a given displacement of the friction pads at low pressures.

Brake pedal travel can be reduced to a minimum by adjustment of the loading of the valve sleeve 37 and the arrangement may be such that in normal brake applications this valve remains closed, the forward movement of the valve piston when the master cylinder is actuated displacing sufficient liquid from the forward end of the valve cylinder to apply the brake fully before the piston reaches its stop.

In the valve shown diagrammatically in Figure 3 the passage 50 is connected to the master cylinder and leads into the rear end of a stepped or differential cylinder 51. A stepped piston 52 works in the cylinder of which the forward end is connected through a passage 53 to a pipe or passage connecting an opposed pair of brake cylinders. An axial bore 54 through the piston is controlled by a spring-loaded one-way ball valve 55 which allows liquid to pass from the front to the rear of the cylinder at a predetermined pressure difference. This passage 53 is connected through a spring-loaded one-way valve 56 to a chamber 57 which is connected through a further one-way valve 58 with the passage 50. The chamber 57 is intersected by a bore 59 of which the upper end is connected through a one-way valve 60 with a liquid reservoir and the lower end leads into the cylinder 51 at the step in diameter. An annular groove 61 is formed in the piston immediately behind the step.

This valve 56 is loaded to a lower pressure than the valve 55 in the piston and the valves 58 and 60 are very lightly loaded.

When the brake pedal is depressed liquid is forced from the master cylinder through the passage 50 into the rear end of the cylinder and the pressure acting on the rear end of the cylinder advances the piston which displaces liquid from the forward end of the cylinder into the brake cylinders to apply the brakes. As the rear end of the piston is of smaller diameter than the front end a relatively smaller displacement of the master cylinder piston is required to produce a given displacement of the friction pads in the brake cylinders and the travel allowed to the piston is sufficient for normal braking without the passage of any liquid through the valve 55 in the piston. If the pressure in the forward end of the cylinder rises to a value exceeding the loading of the valve 56 liquid passes through that valve into the chamber 57 and into the bore 59 so that it acts on the annular surface of the step in the piston and the pressure exerted by the master cylinder thus acts on an area equal to that of the forward end of the piston without any differential action to produce the maximum braking effort.

When the brake pedal is released the pressure in the rear end of the cylinder is relieved and the liquid returning from the brake cylinders and acting on the front end of the piston returns the piston to its normal position. At the same time the valve 56 closes and liquid displaced from the annular space behind the step in the piston returns through the valve 58 to the passage 50 and so to the master cylinder.

When the brake is off, if there is a negative pressure in the pipe line leading to the master cylinder liquid can flow from the reservoir through the valves 60 and 58 into the passage 50.

In the application of the brake if the pressure exerted by the master cylinder continues to rise, after the piston 52 has reached the limit of its forward travel, until the pressure exceeds the loading of the valve 55 in the piston, liquid can pass through that valve into the forward end of the cylinder and so into the brake cylinders to increase the braking effort. Any excess of liquid passing through the valve 55 in this way will be returned through the valve 58 when the brake is released.

Normally in the off position of the brake the valve 56 remains closed and while liquid can pass freely between the liquid spaces of the two brake cylinders it cannot return to the master cylinder. If, however, for any reason such as overheating of the brake the pressure in the brake cylinders exceeds the loading of the valve 56 that valve opens and allows liquid to escape from the brake cylinders to the master cylinder.

The valve shown in Figure 4 is a practical form of the valve shown diagrammatically in Figure 3. The same numerals have been applied to the corresponding passages and valves and no further description is necessary.

The valve shown in Figures 5, 6 and 7 is the same in principle and operation as the valve shown in Figures 3 and 4 but the parts are differently arranged.

A union 70 in one end of the body 71 of the valve is adapted to be connected by a pipe line to a master cylinder and is connected by an inclined passage 72 to the rear end of a stepped or differential cylinder 73 in the body. A stepped piston 74 works in the cylinder and has an axial bore 75 controlled by a spring-loaded one-way valve 76. The forward end of the cylinder is closed by a screwed plug 77 of which the inner end forms a limiting stop for the forward movement of the piston. The liquid space at the forward end of the cylinder is connected by a vertical passage 78 to a union 79 adapted to receive a pipe leading to a pipe or passage connecting two opposed brake cylinders. A transverse passage 80 controlled by a spring-loaded ball valve 81 connects the passage 78 with a longitudinal bore 82 leading through a spring-loaded ball valve 83 into the union 70. The bore 82 is also connected with the cylinder bore at the step in diameter and is connected through a spring-loaded ball valve 84 with a union 85 adapted to be connected to a reservoir.

When the pedal operating the piston of the master cylinder is depressed liquid is forced into the rear end of the cylinder 73 and advances the piston 74 which displaces liquid from the forward end of the cylinder through the passage 78 to the brake cylinder to apply the brake. If the pressure in the forward end of the cylinder exceeds the loading of the valve 81 the liquid has access through that valve and the passage 82 to the step or shoulder on the piston and additional liquid can pass through the piston when the pressure exerted by the master cylinder exceeds the loading of the valve 76. On release of the brake surplus liquid behind the valve 81 can return to the master cylinder through the valve 83. If make-up liquid is required it can pass from the reservoir through the valves 84 and 83 to the master cylinder.

The valve shown in Figure 8 is designed for insertion in a pipe line connecting a master cylinder to a passage or pipe connecting two opposed brake cylinders.

It comprises a cylindrical body 90 having at its forward end a union 91 for connection to the brake cylinders. A small axial bore 92 in this end of the cylinder leads into a cylindrical bore 93 of substantial diameter extending in from the rear end of the body. The outer end of the bore 93 is closed by a plug 94 having a union 95 for connection to the master cylinder. An axial bore 96 in the plug is bifurcated at its inner end to leave a projecting axial peg 97. Working in the bore 93 is a piston 98 comprising a hollow sleeve closed at both ends except for small axial apertures. The aperture at the rear end of the piston is normally closed by an internal ball-valve 99 loaded by a spring 100 interposed between the ball and the front end of the piston.

When the pedal operating the master cylinder is depressed liquid is forced into the rear end of the bore 93 and advances the piston 98 which displaces liquid from the forward end of the bore into the brake cylinders to apply the brake. When the piston reaches the forward end of the bore, if the pressure behind it continues to increase the valve 99 opens and liquid can pass through the piston to increase the braking effort. When the brake is released liquid returning from the brake cylinders returns the piston to the rear end of the bore and if excess liquid has passed through the piston the piston will return until the ball valve is urged against and is opened by the peg 97 so that the excess liquid can return to the master cylinder.

Normally in the off position of the brake the piston is in the position shown in the drawing in which the valve is closed so that while liquid can flow between the liquid spaces of the two brake cylinders it cannot return to the master cylinder. If for any reason such as over-heating of the brake the pressure in the brake cylinders rises beyond a predetermined value the piston will be urged rearwardly against the peg 97 with sufficient force to open the valve and the pressure will be relieved.

My invention is of particular advantage where the brake pads are in light rubbing contact with the disc in the "off" position of the brake, as described in the specification of United States Patent No. 2,371,554. In that arrangement, as there is no lost motion of the master cylinder piston in bringing the pads into engagement with the drum, a very high leverage ratio between the pedal and the brake can be employed and even a small increase in the amount of liquid to be forced into a brake cylinder due to movement of a pad away from the disc would lead to a large increase in the pedal travel in the application of the brake.

I claim:

1. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting the other ends of said brake cylinders to each other so as to allow free passage of liquid between them, a master cylinder for supply liquid under pressure to said brake cylinders, a pipe line between said master cylinder and said conduit and restrictive means in said pipe line for controlling the passage of liquid between said master cylinder and said conduit.

2. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting the other ends of said brake cylinders to each other so as to allow free passage of liquid between them, a master cylinder for supplying liquid under pressure to said brake cylinders, a pipe-line between said conduit and the master cylinder, and a choke in said pipe-line for restricting the flow therethrough.

3. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting the other ends of said brake cylinders to each other so as to allow free passage of liquid between them, a master cylinder for supplying liquid under pressure to said brake cylinders, and a pipe line including a flow control unit between said conduit and the master cylinder, said unit incorporating a first passage and a valve means therein for permitting liquid to pass from the master cylinder to the brake cylinders only at a predetermined pressure, and a second passage and a second valve means therein for permitting liquid to return from the brake cylinders to the master cylinder only at a predetermined higher pressure.

4. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting the other ends of said brake cylinders to each other so as to allow free passage of liquid between them, a master cylinder for supplying liquid under pressure to said brake cylinders, and a flow control unit between said conduit and the master cylinder, said control unit comprising a fourth cylinder connected at one end to the master cylinder and at the other end to said conduit, a piston axially movable by liquid pressure in said fourth cylinder, an abutment in said fourth cylinder to limit the axial movement of said piston, a first and a second passage connecting the ends of said fourth cylinder and by-passing said piston, a first spring-loaded valve in said first passage for permitting liquid from the master cylinder to by-pass the piston when the pressure exerted by the master cylinder exceeds a predetermined value, and a second spring-loaded valve in said second passage for permitting liquid to pass from the brake cylinders to the master cylinder when the pressure in the brake cylinders exceeds that in the master cylinder by a predetermined value.

5. A brake as in claim 4 wherein said piston is a hollow member working in said fourth cylinder, said first valve is a spring-loaded sleeve working in said piston, and said second valve is mounted in said sleeve and is located to open at a higher pressure than the sleeve.

6. A brake as in claim 4 wherein said first passage extends through said piston.

7. A brake as in claim 4 further comprising a third lightly loaded non-return valve mounted in said second passage adjacent to the connection of said passage with that end of the fourth cylinder which is connected to the master cylinder.

8. A brake as in claim 4 wherein said second passage connecting the ends of said fourth cylinder includes a branch adapted to be connected with a liquid reservoir, and a non-return valve in said branch.

9. A brake as in claim 4 wherein said fourth cylinder and piston are stepped in diameter, the smaller end of the fourth cylinder being connected to the master cylinder, a branch leading from said second passage on the outlet side of the second valve therein to the step in the diameter of the fourth cylinder, a third non-return valve in the second passage between said branch and the smaller end of the fourth cylinder, said second valve opening when the pressure in the brake cylinders exceeds a predetermined value so as to allow access of the liquid to the step in the piston thereby to augment the force exerted on the smaller end of the piston by the master cylinder.

10. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting the other ends of said brake cylinders to each other so as to allow free passage of liquid between them, a master cylinder for supplying liquid under pressure to said brake cylinders, and a pipe line including a flow control unit between said conduit and the master cylinder, said unit comprising a fourth cylinder connected at one end to the master cylinder and at the other end to said conduit, a hollow piston axially movable in said fourth cylinder, a spring loaded valve mounted in the piston and normally closing the end of the piston adjacent to the end of the fourth cylinder which is connected to the master cylinder, and an axial peg in said end of the fourth cylinder for engaging and unseating said valve to allow liquid to pass from the brake cylinders to the master cylinder when said piston is moved axially beyond its normal position by the pressure of liquid in the brake cylinders.

11. A disc brake for vehicles comprising a disc coupled to and rotating with a wheel of the vehicle, a stationary housing straddling the edge of the disc, opposed hydraulic brake cylinders in said housing, said cylinders being open at their inner ends adjacent to the disc, a friction pad slidably mounted in the inner end of each cylinder for engagement with opposite faces of said disc, a piston slidable in each cylinder for engaging the pad in the cylinder and urging it into engagement with the disc, a conduit connecting said brake cylinders, a master cylinder, and a pipe line including a flow control unit between said conduit and the master cylinder, said control unit comprising a fourth cylinder adapted for connection at one end to the master cylinder and at the other end to the conduit connecting said brake cylinders, a piston axially movable in said fourth cylinder, stops in said fourth cylinder limiting the axial movement of the piston, and two spring-loaded oppositely acting non-return valves in two passages, respectively, each of said passages connecting the ends of said fourth cylinder, one of said valves being loaded to open at a higher pressure than the other.

References Cited in the file of this patent

UNITED STATES PATENTS

| | | |
|---|---|---|
| 1,954,534 | Norton | Apr. 10, 1934 |
| 2,416,091 | Fitch | Feb. 18, 1947 |
| 2,466,990 | Johnson et al. | Apr. 12, 1949 |
| 2,544,849 | Martin | Mar. 13, 1951 |
| 2,591,793 | Dubois et al. | Apr. 8, 1952 |

FOREIGN PATENTS

| | | |
|---|---|---|
| 695,921 | Germany | Sept. 6, 1940 |